Patented Feb. 27, 1940

2,191,753

UNITED STATES PATENT OFFICE 2,191,753

QUATERNARY AMMONIUM COMPOUNDS AND A PROCESS OF MAKING THEM

Donald Drake Coffman, Wilmington, Del., assignor to E. I. du Pont de Nemours & Company, Wilmington, Del., a corporation of Delaware No Drawing. Application September 15, 1938, Serial No. 230,115

15 Claims. (Cl. 260—584)

This invention relates to quaternary ammonium compounds.

This invention has as an object the preparation of new polymeric products. A further object is the preparation of materials useful as mold inhibitors, pesticides, e. g., bactericides, pour-point depressants, surface-active agents, and modifying agents for viscose rayon and the like. Other objects will appear hereinafter.

These objects are accomplished by the following invention wherein a compound containing two and only two groups selected from the class consisting of

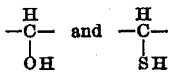

groups is reacted under anhydrous conditions with formaldehyde, an anhydrous acid, and a ditertiary diamine wherein, for each nitrogen atom, the radical joining the nitrogens and the radical or radicals attached to each nitrogen comprise at least two saturated radicals.

The term "compound having two and only two groups selected from the class consisting of

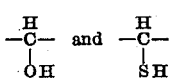

groups" includes a glycol, a dithiol, or a compound having one alcohol and one thiol group, the total number of alcohol and/or thiol groups not exceeding two.

In carrying out the invention, the compound containing two and only two groups selected from the class consisting of

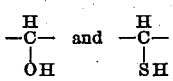

groups, formaldehyde, and amine are first mixed, preferably in stoichiometric proportions, as more fully explained below, optionally in the presence of a suitable inert solvent for the reactants, such as benzene. The anhydrous acid, such as hydrogen chloride, is then passed in at room temperature, with external cooling if necessary to dissipate the heat of reaction, until absorption of the gas ceases. If no solvent is used initially, and if the reaction mixture becomes solid during the course of the reaction, it is desirable to introduce a solvent or to apply external heat to an extent sufficient to keep the mixture in the molten state. When absorption of gaseous acid ceases, any solvent present is removed, as by distillation in vacuo, no further purification of the remaining polymeric quaternary salt being necessary. By stoichiometric proportions is meant that, for each mol of compound containing two and only two groups selected from the class consisting of

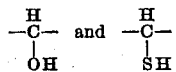

groups, there is used two mols of formaldehyde and a number of mols of diamine which is equal to the valency of the anion of the acid employed, or whose anhydride is employed. Thus, with sulfur dioxide the molal ratio of compound containing two and only two groups selected from the class consisting of

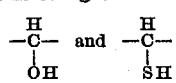

groups to amine to formaldehyde is 1:2:2 and with hydrogen chloride, the ratio is 1:1:2.

The more detailed practice of the invention is illustrated by the following examples, wherein parts given are by weight. There are of course many forms of the invention other than these specific embodiments.

Example I

Decamethylene glycol (17.4 parts), para-formaldehyde (6 parts), and tetramethylhexamethylenediamine (34.4 parts) are mixed in a reaction vessel equipped with a thermometer, reflux condenser, and a gas inlet tube leading to the bottom of the vessel. Sulfur dioxide is bubbled rapidly through the reaction mixture for a period of 20 minutes, during which time the temperature rises rapidly to 90° C. The reaction mixture is a light yellow, clear liquid. At this point, benzene (135 parts) is added as a diluent, and the sulfur dioxide is passed through the reaction mixture for an additional 30 minutes. The solution is filtered, and the excess benzene is removed under diminished pressure. The polymeric quaternary salt solidifies to a waxy substance soluble in methanol, ethanol, benzene, toluene, decahydronaphthalene, and ligroin, and insoluble in ether. A yield of 57 parts of material melting at about 35° C.–40° C. is obtained. The final product contained 13.61% sulfur.

Example II

Decamethylene glycol (20.57 parts), para-formaldehyde (7.13 parts), and tetramethylhexamethylenediamine (20.46 parts) are dissolved in benzene (180 parts) and the solution placed in a reaction vessel equipped with a reflux condenser and a gas inlet tube leading to the bottom of the vessel. Anhydrous hydrogen chloride is passed into the reaction mixture until no more is absorbed. A precipitate forms at first but redissolves after an excess of hydrogen chloride is bubbled through the mixture. The solution is filtered and the benzene removed under diminished pressure. The polymeric quaternary salt which is thus obtained in about 85% yield is a white, hard, readily pulverized product, melting at about 85° C. and containing 17.59% chlorine. It is sparingly soluble in alcohol and water.

*Example III*

β-mercaptoethanol (3.90 parts), para-formaldehyde (3.0 parts), and tetramethylhexamethylenediamine (17.2 parts) are dissolved in benzene (68 parts). Sulfuric acid (10 parts) is added in portions over a period of about 30 minutes, with rapid stirring, whereby a precipitate insoluble in benzene is formed. The benzene is removed by decantation, and the precipitate washed free of excess acid by shaking with several portions of cold water. A waxy polymeric material melting slightly above room temperature is formed. It is dissolved in methanol, the solution filtered, and the methanol is distilled off under diminished pressure. The residual polymeric quaternary salt contains 14.48% sulfur. It is soluble in methanol and ethanol, slightly soluble in water, and insoluble in benzene.

*Example IV*

Decamethylenedithiol (2.06 parts), para-formaldehyde (0.6 part), and tetramethylhexamethylenediamine (3.44 parts) are dissolved in benzene (45 parts). Carbon dioxide is bubbled through the solution for a period of thirty minutes. Only a slight rise in temperature is noticed at the beginning of the reaction. The benzene is removed under diminished pressure, and the resulting product is heated at 100° C. at about 20 mm. pressure. Some decomposition takes place under these conditions, but an oily polymeric quaternary salt is nevertheless obtained. This polymer contains 15.03% sulfur, is soluble in benzene, ethanol, and dioxan, and is sparingly soluble in water.

*Example V*

α,α'-diphenylhexamethylene glycol (13.7 parts), para-formaldehyde (3.0 parts), and tetramethylhexamethylenediamine (8.6 parts) are dissolved in benzene (45 parts). Hydrogen sulfide is bubbled through the mixture until no more is absorbed. A slight increase in temperature is noted at first, and shortly thereafter a heavy, white precipitate begins to form that does not redissolve when more benzene is added. This polymeric material is filtered, washed with fresh benzene, and dried in vacuo. The dried polymeric quaternary salt has a sulfur content of 5.81%, melts over a range from 110°–130° C., is slightly soluble in water, benzene and ethanol, and is appreciably soluble in chloroform.

Any compound containing two and only two groups selected from the class consisting of

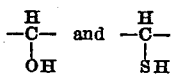

groups may be used in the process of the present invention. The compound containing two and only two groups selected from the class consisting of

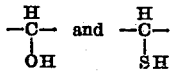

groups may be diprimary disecondary or primary secondary. The suitable compounds may be formulated as HX—R—XH wherein X is oxygen or sulfur and R is a bivalent organic radical the two valences of which stem from aliphatic carbons, i. e., carbon which is not a part of an aromatic (including aromatic heterocyclic) ring, which aliphatic carbons also each bear at least one hydrogen. The carbons bearing the hydroxyl or thiol groups, having as they do both an hydroxyl or thiol group and a hydrogen atom, cannot be members of an aromatic ring. The compound containing two and only two groups selected from the class consisting of

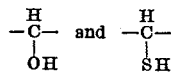

groups, subject to the above qualifications, may be aliphatic or aromatic, cyclic or acyclic, homocyclic or heterocyclic, saturated or unsaturated, substituted or not by groups, e. g., ether, sulfide, ester, nitro, ketone, tertiary amide, nitrile, etc., which do not interfere with the reaction. specific suitable compounds include the following: ethylene glycol, hexamethylene glycol, decamethylene glycol, octadecamethylene glycol, diethylene glycol, 1,4-cyclohexylene glycol, p-xylylene glycol, camphene glycol, 2,4-dihydroxyhexane, 1,5-dimercapto-3-oxapentane, 1,5-dimercaptothiapentane, 1,6 - dihydroxy - 2,5 - dimethylhexane, 2-mercaptoethanol, conylene glycol. A highly preferred class of compounds is the completely aliphatic and preferably saturated compound containing two and only two groups selected from the class consisting of

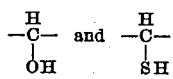

groups. Of these the dihydroxy compounds are the more desirable.

As previously indicated, any ditertiary diamine in which, for each amino nitrogen, the radical joining the amino nitrogens and the radical or radicals attached to each amino nitrogen comprise at least two saturated radicals, may be used in the present process. Thus, in the diamine

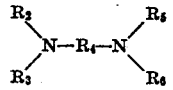

of the three radicals attached to each nitrogen, one, i. e., $R^2$, $R^3$ or $R^4$ may be unsaturated, but, if $R^4$ is unsaturated, $R^2$, $R^3$, $R^5$ and $R^6$ must be saturated. If $R^2$ is unsaturated, $R^3$ and $R^4$ must be saturated, and one only of $R^5$ and $R^6$ may be unsaturated. The aromatic ring is "unsaturated" in the above sense. Subject to the requirement just indicated as to saturation, the divalent radical joining the nitrogens may be aliphatic or aromatic, cyclic or acyclic, homocyclic or heterocyclic, saturated or unsaturated, and may be substituted or not by groups which do not interfere with the polymer-forming reaction, such as ether, sulfide, ketone, nitro, amide, hydroxyl, thiol, and the like. The radicals to which only one nitrogen is attached may be of the same character, or one or both nitrogens may be attached to a single divalent radical of any of the above-mentioned types, the nitrogen thereby forming a part of a heterocyclic ring. Preferably, the radicals other than that joining the nitrogens contain not more than about six carbon atoms each since extent and speed of polymer formation are favored by low molecular weight radicals. Preferably, the diamine is wholly saturated since saturation favors stability of the product. Preferably, the radical between the nitrogens and all the other radicals attached to the nitrogens are hydrocarbon radicals. In general, the saturated N,N,N',N'-tetraalkylpolymethylenediamines in which each of the four alkyl groups has not more than six carbons will give best results from all points of view. Specific amines which are suitable include the following: N,N,N',N' - tetramethyltriethyleneglycoldiamine, N,N,N',N' - tetraethyl-1,4-cyclohexylenediamine, 1,10-bis(diethylaminomethoxy) decane, N,N'bis-(2-hydroxyethyl)piperazine, bis-(4-morpholino)dodecane, bis-(1 - piperidyl)octane, 1,6-bis(dimethylamino)-2,5-dimethylhexane, N,N,N',N'-tetramethyl-p-phenylenediamine, N,N,N',N'-tetraethyl-1,6-diamino-3-hexene, N-allyl - N,N'N'-trimethyloctadecamethylenediamine, and triethylenediamine.

Any non-oxidizing inorganic anhydrous acid, which term for present purposes is intended to include the anhydride, may be used, among them sulfur dioxide, hydrogen chloride, hydrogen bromide, hydrogen sulfide, sulfur trioxide, phosphoric acid, sulfuric acid, hydrogen fluoride, hydrogen cyanide, nitrogen trioxide, hydrogen iodide, and the like. Carbon dioxide may also be used with some success. Preferably the anhydrous acid should be gaseous at the temperature under which the process is carried out.

The formaldehyde is preferably used as paraformaldehyde but may be used as a gas in which instance it is bubbled in along with the acid gas.

The process may be carried out in the presence of any anhydrous diluent which, under the conditions of the process, is a solvent for the amine and compound containing two and only two groups selected from the class consisting of

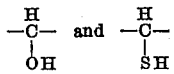

groups, is a solvent or non-solvent for the anhydrous acid and for the product, and is chemically inert toward reactants and product. Suitable specific diluents include xylene, toluene, benzene, dioxan, ligroin, ethylene glycol dimethyl ether, dibutyl ether, cyclohexane, and diethyl ether. In general hydrocarbons and ethers are suitable, while hydroxylated compounds, ketones, esters, and most halides should be avoided.

In carrying out the present process, the temperatures may range from that at which reaction begins to be perceptible, frequently as low as −20 or −30° C., up to the decomposition temperature of the reactants or products, which may be as high as 200–225° C. Very high temperatures are rarely necessary. Preferably the process will be carried out at temperatures of from about 20° C. to about 90° C., the temperature being increased as the reaction proceeds. The process is continued until no more of the anhydrous acid is absorbed, this usually taking place within thirty to forty-five minutes.

The reactants need not be present in stoichiometric proportions but far better results are obtained when stoichiometric proportions, as near as can readily be obtained, are used, particularly of the compound containing two and only two groups selected from the class consisting of

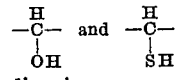

groups and the diamine.

The products of the present invention are of use as mold inhibitors, pesticides (e. g., bactericides), pour-point depressants, surface-active agents, and modifying agents for viscose.

In the specification and claims the term "aliphatic carbon" is used to indicate a carbon which is part of any open or closed chain, with or without hetero atoms, but not part of an aromatic ring.

The above description and examples are intended to be illustrative only. Any modification of or variation therefrom which conforms to the spirit of the invention is intended to be included within the scope of the claims.

I claim:

1. Process which comprises reacting formaldehyde, under anhydrous conditions, with a compound containing two and only two groups selected from the class consisting of

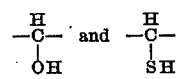

groups, a ditertiary diamine in which, for each amino nitrogen, the radical joining the amino nitrogens and the remaining radicals comprise at least two saturated radicals, and a non-oxidizing, inorganic, anhydrous acid.

2. Process which comprises reacting formaldehyde, under anhydrous conditions, and in substantially stoichiometric proportions with a compound containing two and only two groups selected from the class consisting of

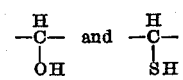

groups, a ditertiary diamine in which, for each amino nitrogen, the radical joining the amino nitrogens and the remaining radicals comprise at least two saturated radicals, and a non-oxidizing, inorganic, anhydrous acid.

3. Process which comprises reacting, under anhydrous conditions, formaldehyde, an aliphatic glycol having at least one hydrogen attached to each carbinol carbon, a saturated aliphatic ditertiary diamine, and a non-oxidizing, inorganic, anhydrous acid.

4. Process which comprises reacting, under anhydrous conditions, and in substantially stoichiometric proportions, formaldehyde, an aliphatic glycol having at least one hydrogen attached to each carbinol carbon, a saturated aliphatic ditertiary diamine, and a non-oxidizing, inorganic, anhydrous acid.

5. Process which comprises reacting, under anhydrous conditions, formaldehyde, an aliphatic glycol having at least one hydrogen attached to each carbinol carbon, a saturated aliphatic ditertiary diamine and sulfur dioxide.

6. Process which comprises reacting, under anhydrous conditions, and in substantially stoichiometric proportions, formaldehyde, an aliphatic glycol having at least one hydrogen attached to each carbinol carbon, a saturated aliphatic ditertiary diamine and sulfur dioxide.

7. Process which comprises reacting, under anhydrous conditions, paraformaldehyde, decamethylene glycol, tetramethylhexamethylenediamine and sulfur dioxide.

8. Products obtained by the process of claim 1.

9. A condensation product of formaldehyde, an aliphatic glycol having at least one hydrogen attached to each carbinol carbon, a saturated aliphatic ditertiary diamine, and a non-oxidizing, inorganic, anhydrous acid.

10. A condensation product of formaldehyde, an aliphatic glycol having at least one hydrogen attached to each carbinol carbon, a saturated aliphatic ditertiary diamine, and sulfur dioxide.

11. A condensation product of formaldehyde, decamethylene glycol, tetramethylhexamethylenediamine and sulfur dioxide.

12. A condensation product of formaldehyde, a compound having two and only two groups of the class consisting of

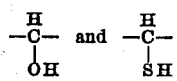

groups, a ditertiary amine in which, for each amino nitrogen, the radical joining the amino nitrogens and the remaining radicals comprise at least two saturated radicals, and a non-oxidizing, inorganic, anhydrous acid.

13. The condensation product of claim 12 wherein the components are present in substantially stoichiometric proportions.

14. A condensation product of formaldehyde, hexamethyleneglycol, tetramethylhexamethylenediamine and sulfur dioxide.

15. A condensation product of formaldehyde, hexamethyleneglycol, tetramethylhexamethylenediamine and hydrogen chloride.

DONALD DRAKE COFFMAN.